United States Patent
Yeh

(10) Patent No.: US 10,790,099 B2
(45) Date of Patent: Sep. 29, 2020

(54) ELECTRONIC DEVICE WITH SWITCH BUTTON MODULE AND SWITCH BUTTON MODULE THEREOF

(71) Applicant: Wiwynn Corporation, New Taipei (TW)

(72) Inventor: Ping Sheng Yeh, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 0 days.

(21) Appl. No.: 16/141,553

(22) Filed: Sep. 25, 2018

(65) Prior Publication Data

US 2019/0348229 A1 Nov. 14, 2019

(30) Foreign Application Priority Data

May 11, 2018 (TW) .............................. 107116120 A

(51) Int. Cl.
*H01H 3/12* (2006.01)
*H01H 3/04* (2006.01)
*G06F 1/18* (2006.01)

(52) U.S. Cl.
CPC ................ *H01H 3/12* (2013.01); *H01H 3/04* (2013.01); *G06F 1/185* (2013.01); *H01H 2219/044* (2013.01); *H01H 2219/062* (2013.01); *H01H 2221/024* (2013.01); *H01H 2221/044* (2013.01); *H01H 2221/08* (2013.01); *H01H 2231/002* (2013.01)

(58) Field of Classification Search
CPC .. H01H 3/04; H01H 3/46; H01H 3/38; H01H 2235/01; H01H 21/24; H01H 71/505; H01H 3/12; H01H 71/52; H01H 9/02; H01H 33/42; H01H 13/36; H01H 17/18
See application file for complete search history.

(56) References Cited

U.S. PATENT DOCUMENTS

| | | | |
|---|---|---|---|
| 7,331,201 B2* | 2/2008 | No | D06F 39/005 |
| | | | 200/332 |
| 2004/0154649 A1 | 8/2004 | No et al. | |
| 2011/0209974 A1* | 9/2011 | Yuasa | H01H 13/023 |
| | | | 200/314 |

FOREIGN PATENT DOCUMENTS

| | | |
|---|---|---|
| CN | 102110536 A | 6/2011 |
| CN | 102683069 A | 9/2012 |
| TW | 201340152 A | 10/2013 |
| TW | I492256 B | 7/2015 |
| TW | M532089 U | 11/2016 |
| TW | 201711074 A | 3/2017 |
| TW | 200814116 A | 3/2018 |

* cited by examiner

*Primary Examiner* — Ahmed M Saeed

(57) ABSTRACT

A switch button module is provided. The switch button module is adapted to be disposed in an electronic device. The electronic device includes a housing, a circuit board, and a switch element. The circuit board is disposed in the housing. The switch element is disposed on the circuit board. The switch button module includes a mounting base, a connection rod, and a button unit. The mounting base is affixed to the housing, wherein the mounting base is located between an edge of the circuit board and the housing. The connection rod pivots on the mounting base. The connection rod rotates between a first orientation and a second orientation.

14 Claims, 13 Drawing Sheets

ELECTRONIC DEVICE WITH SWITCH BUTTON MODULE AND SWITCH BUTTON MODULE THEREOF

CROSS REFERENCE TO RELATED APPLICATIONS

This Application claims priority of Taiwan Patent Application No. 107116120, filed on May 11, 2018, the entirety of which is incorporated by reference herein.

BACKGROUND OF THE INVENTION

Field of the Invention

The present invention relates to an electronic device, and in particular to an electronic device with a switch button module.

Description of the Related Art

The size of many commercially available electronic devices (such as desktop computers and servers) has decreased in recent years, and the elements inside these electronic devices are arranged close together. However, when the demands on one specific element (such as a network card or graphics card) increases, the size of the specific element (such as the network card or graphics card) must also increase. When a functional request element is disposed on the mainboard, the functional request element may protrude from the edge of the mainboard. After the mainboard is disposed in the housing of the electronic device, the power switch and the reset switch of the mainboard are therefore difficult to touch.

BRIEF SUMMARY OF THE INVENTION

In one embodiment, a switch button module is provided. The switch button module is adapted to be disposed in an electronic device. The electronic device comprises a housing, a circuit board, and a switch element. The circuit board is disposed in the housing. The switch element is disposed on the circuit board. The switch button module comprises a mounting base, a connection rod, and a button unit. The mounting base is affixed to the housing, wherein the mounting base is located between the housing and an edge of the circuit board. The connection rod pivots on the mounting base. The connection rod comprises a first connection rod end and a second connection rod end. The connection rod rotates between a first orientation and a second orientation. When the connection rod is in the first orientation, the second connection rod end does not activate the switch element. When the connection rod is in the second orientation, the second connection rod end activates the switch element. The button unit is connected to the connection rod, wherein the button unit comprises a button, and when the button is pushed from a first position to a second position, the button unit pushes the connection rod from the first orientation to the second orientation.

In another embodiment, an electronic device is provided. The electronic device includes a housing, a circuit board, a switch element, a mounting base, a connection rod and a button unit. The housing includes a first wall and a second wall, wherein the first wall is perpendicular to the second wall, and the first wall comprises an opening. The circuit board is disposed in the housing, wherein the circuit board is parallel to the second wall. The switch element is disposed on the circuit board, wherein the switch element has an activate direction, and the activate direction is perpendicular to the circuit board. The mounting base is affixed to the housing. The connection rod pivots on the mounting base, wherein the connection rod comprises a first connection rod end and a second connection rod end, the connection rod rotates between a first orientation and a second orientation, and when the connection rod is in the first orientation, the second connection rod end does not activate the switch element, and when the connection rod is in the second orientation, the second connection rod end activates the switch element. The button unit is connected to the connection rod, wherein the button unit comprises a button, the button corresponds to the opening, and when the button is pushed from a first position to a second position, the button unit pushes the connection rod from the first orientation to the second orientation.

In one embodiment, the mounting base is disposed on the second wall, and the mounting base is disposed between an edge of the circuit board and the first wall.

In one embodiment, the connection rod comprises a first section, a second section and a pivot portion, the pivot portion is located between the first section and a second section, the first connection rod end is located on the first section, and the second connection rod end is located on the second section.

In one embodiment, the electronic device further comprises an elastic element, the elastic element abuts the mounting base and the second section, and when the connection rod is in the second orientation, the elastic element applies an elastic force upon the second section to rotate the connection rod back to the first orientation.

In one embodiment, the mounting base comprises a positioning post, and the elastic element is sleeved on the positioning post.

In one embodiment, the button unit comprises a button inclined surface and a transmission member, the transmission member is connected to the first connection rod end, the transmission member comprises a transmission member inclined surface, and when the button is pushed from the first position to the second position, the button inclined surface pushes the transmission member inclined surface, and the transmission member rotates the connection rod from the first orientation to the second orientation.

In one embodiment, the button unit comprises a button lever, the button lever comprises an abutting portion, a first lever end and a second lever end, the abutting portion is located between the first lever end and the second lever end, the button is formed on the first lever end, the second lever end pivots on the first connection rod end, and when the button is pushed from the first position to the second position, the abutting portion abuts the opening, the button lever rotates in a first rotation direction around the abutting portion, the second lever end pushes the first connection rod end to rotate the connection rod in a second rotation direction around the pivot portion, and the first rotation direction is opposite to the second rotation direction.

In one embodiment, the button unit comprises a first rod and a second rod, the first rod comprises a first rod end and a second rod end, the second rod comprises a third rod end and a fourth rod end, the button is formed on the first rod end, the second rod end pivots on the third rod end, the fourth rod end pivots on the first connection rod end, and when the button is pushed from the first position to the second position, the first rod pushes the second rod to rotate the second rod in a first rotation direction around the third rod end, and the fourth rod end pushes the first connection rod end to rotate the connection rod in a second rotation direction around the pivot portion, and the first rotation direction is opposite to the second rotation direction.

In one embodiment, the mounting base comprises a groove, the first rod slides in the groove, and when the button is pushed from the first position to the second position, the first rod is moved in a sliding direction, and the sliding direction is parallel to the second wall and perpendicular to the first wall.

In one embodiment, the distance between the fourth rod end and the second wall is longer than the distance between the third rod end and the second wall.

In one embodiment, the electronic device further comprises a light source and a light guiding element, the first wall comprises a light output port, the light source is disposed on the circuit board, and the light guiding element is disposed on the mounting base, and the light guiding element corresponds to the light source and the light output port.

In one embodiment, the light source is disposed on the edge of the circuit board, and the light guiding element is embedded in the mounting base.

In one embodiment, the electronic device further comprises a connection slot, the connection slot is disposed on the circuit board, the connection slot is located between the switch element and the edge of the circuit board, and the connection slot is located between the second section and the circuit board.

In one embodiment, the second section comprises a curved portion, the curved portion forms a recess, and the recess faces the connection slot.

In one embodiment, the electronic element further comprises an expansion card, the expansion card is coupled to the circuit board, the expansion card has an expansion card edge, and the expansion card edge is closer to the housing than the edge of the circuit board.

Utilizing the embodiments of the invention, the problem caused by the functional request element (such as the network card or the graphics card) protruding from the edge of the mainboard is solved, and the power switch and the reset switch on the mainboard can be touched via the switch button module of the embodiment of the invention. Particularly, when the activate direction of the switch element is perpendicular to the circuit board, the switch element can be activated via the design of the mounting base, the connection rod and the button unit to switch the power or reset the system.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
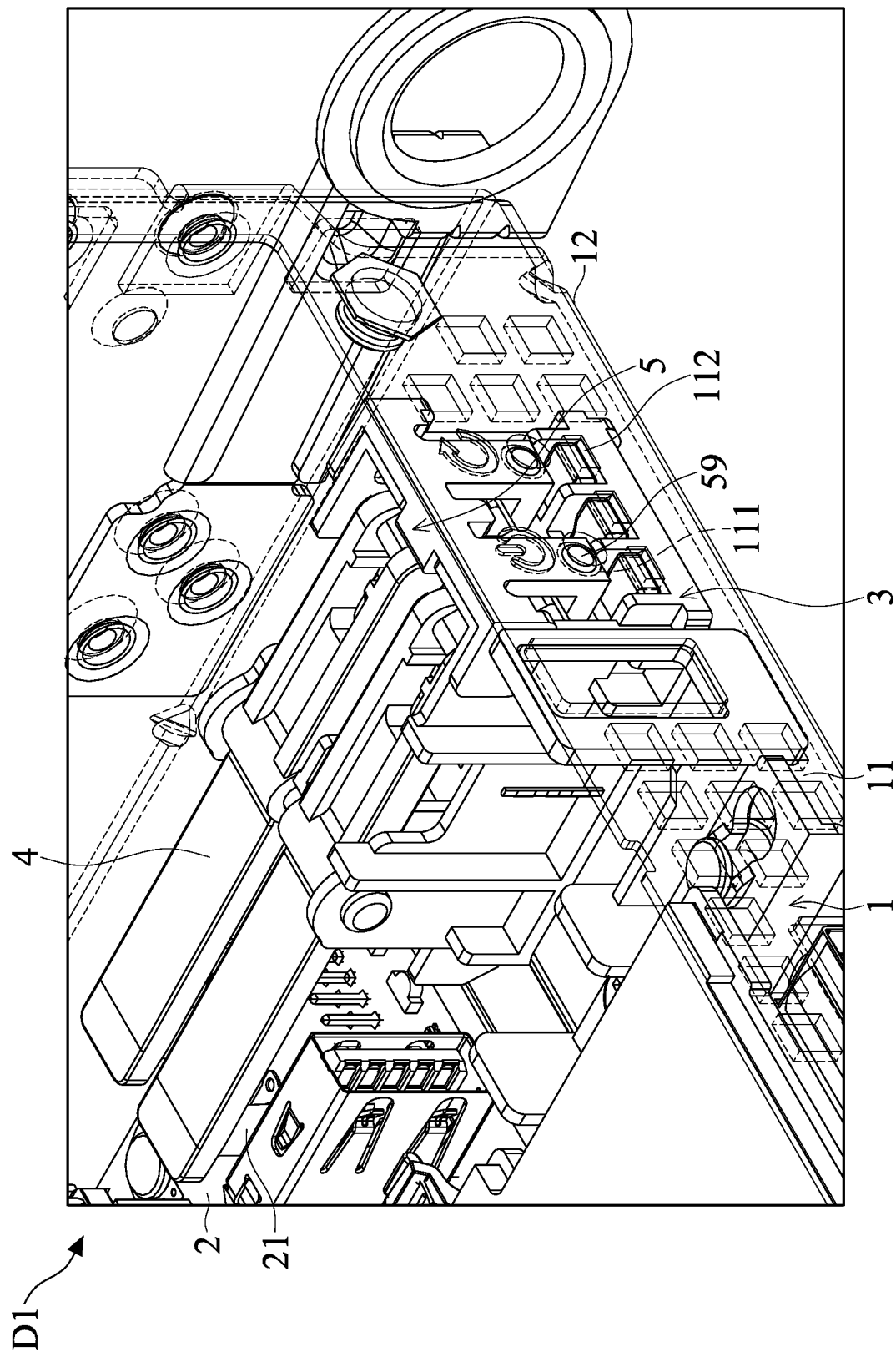
FIG. 1 shows an electronic device of a first embodiment of the invention.
Figure 2A:
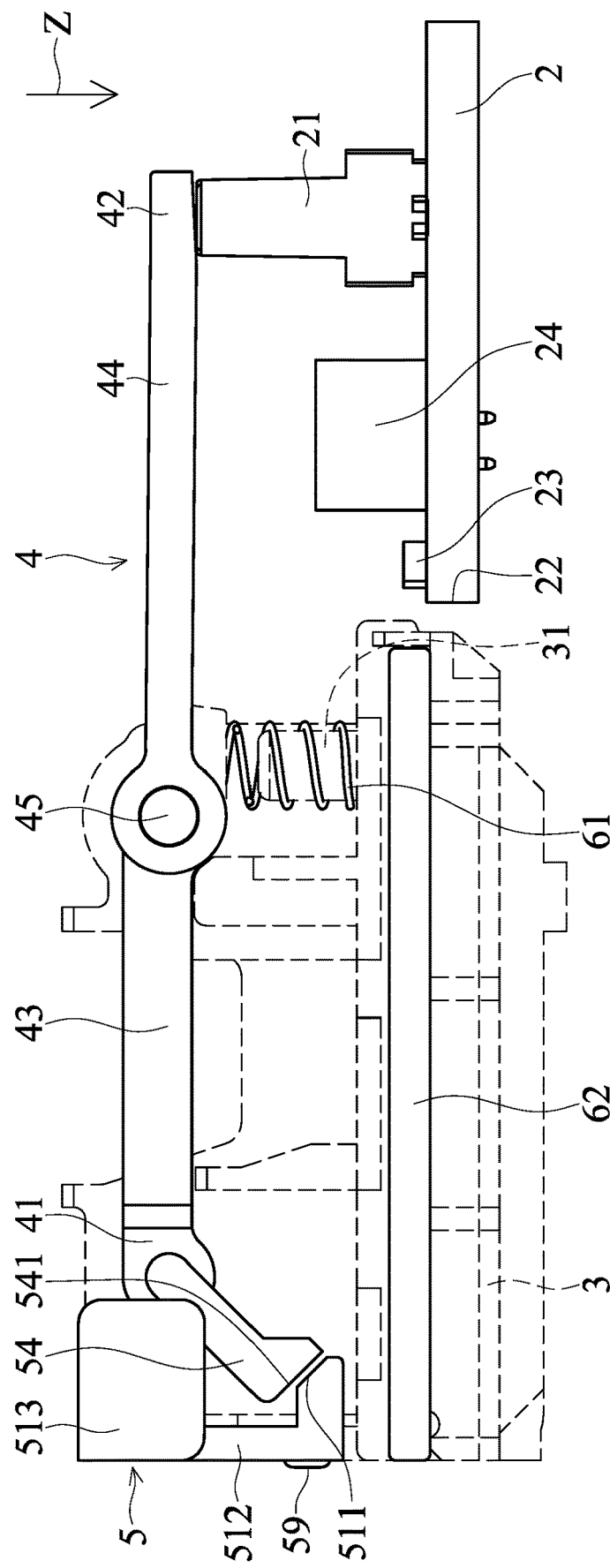
FIG. 2A shows the main structures of the electronic device of the first embodiment of the invention, wherein the connection rod is in the first orientation.
Figure 2B:
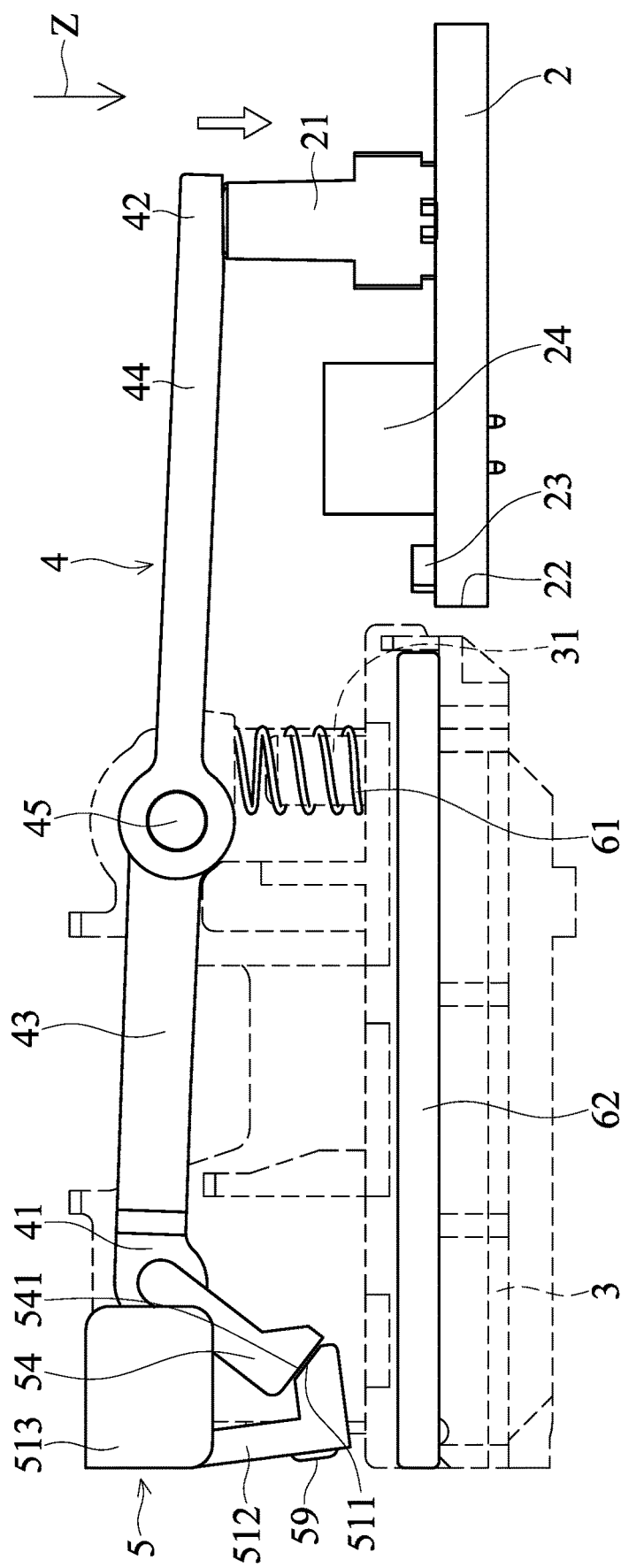
FIG. 2B shows the main structures of the electronic device of the first embodiment of the invention, wherein the connection rod is in the second orientation.

FIG. 1 shows an electronic device D1 of a first embodiment of the invention. FIGS. 2A and 2B show the main structures of the electronic device D1. With reference to FIGS. 1, 2A and 2B, the electronic device D1 of the first embodiment of the invention includes a housing 1 (to clearly present the elements of the electronic device D1, the housing is represented by dotted lines), a circuit board 2, a switch element 21, a mounting base 3, a connection rod 4 and a button unit 5. The housing 1 includes a first wall 11 and a second wall 12. The first wall 11 is perpendicular to the second wall 12. The first wall 11 comprises an opening 111. The circuit board 2 is disposed in the housing 1. The circuit board 2 is parallel to the second wall 12. The switch element 21 is disposed on the circuit board 2. The switch element 21 has an activate direction Z. The activate direction Z is perpendicular to the circuit board 2. The mounting base 3 is affixed to the housing 1. The connection rod 4 pivots on the mounting base 3. The connection rod 4 comprises a first connection rod end 41 and a second connection rod end 42. The connection rod 4 rotates between a first orientation (FIG. 2A) and a second orientation (FIG. 2B). When the connection rod 4 is in the first orientation, the second connection rod end 42 does not activate the switch element 21. When the connection rod 4 is in the second orientation, the second connection rod end 42 activates the switch element 21. The button unit 5 is connected to the connection rod 4. The button unit 5 comprises a button 59. The button 59 corresponds to the opening 111. When the button 59 is pushed from a first position (FIG. 2A) to a second position (FIG. 2B), the button unit 5 pushes the connection rod from the first orientation (FIG. 2A) to the second orientation (FIG. 2B).

In one embodiment, the circuit board 2 is a mainboard.

With reference to FIGS. 2A and 2B, in one embodiment, the connection rod 4 comprises a first section 43, a second section 44 and a pivot portion 45. The pivot portion 45 is located between the first section 43 and a second section 44.

The first connection rod end 41 is located on the first section 43, and the second connection rod end 42 is located on the second section 44.

With reference to FIGS. 2A and 2B, in one embodiment, the electronic device D1 further comprises an elastic element 61. The elastic element 61 abuts the mounting base 3 and the second section 44. When the connection rod 4 is in the second orientation, the elastic element 61 applies an elastic force upon the second section 44 to rotate the connection rod 4 back to the first orientation. In this embodiment, the elastic element 61 is an extension spring, and is disposed adjacent to the pivot portion 45. However, the disclosure is not meant to restrict the invention. The type and the position of the elastic element 61 can be modified.

Figure 3A:
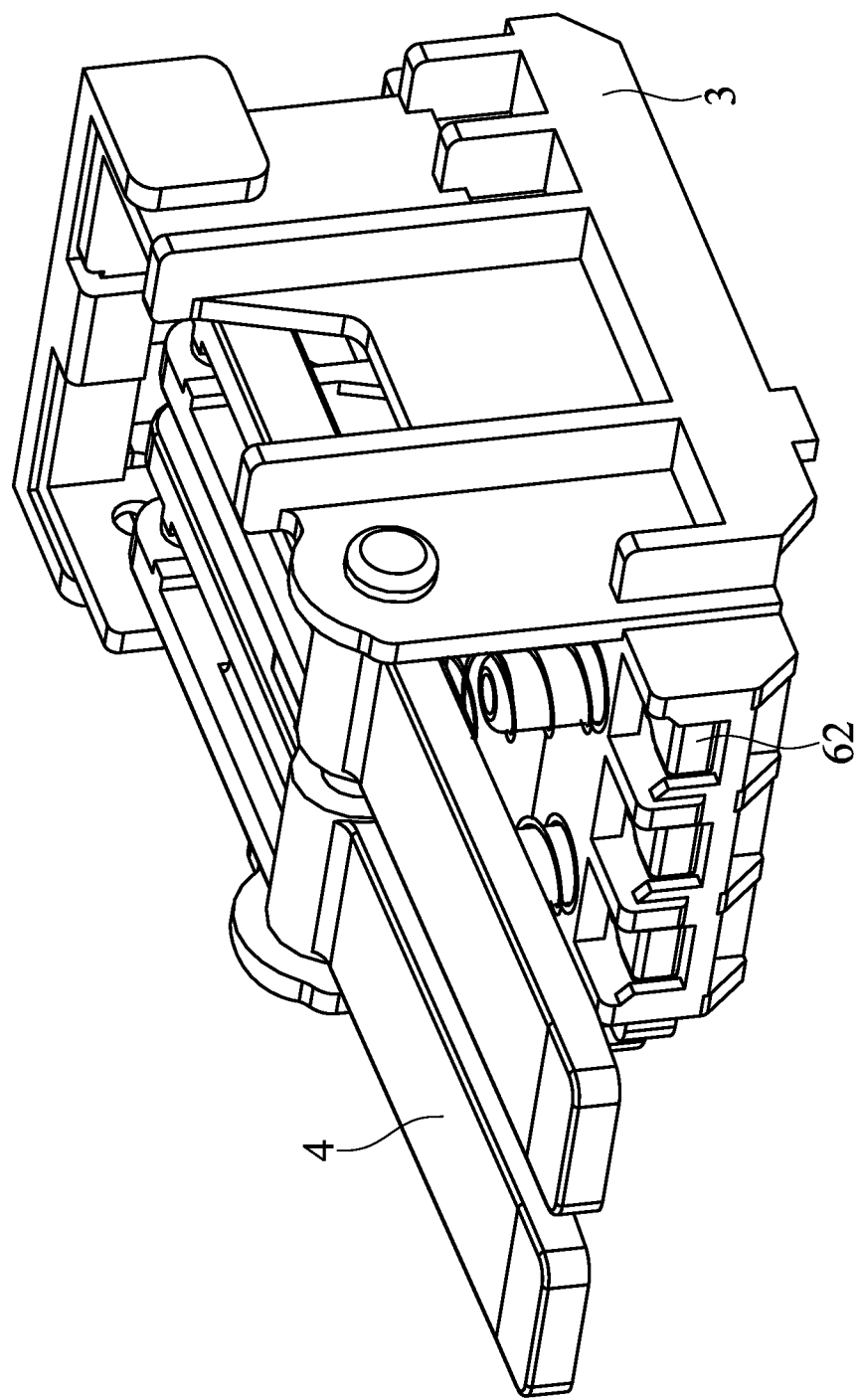
FIGS. 3A and 3B show the details of the mounting base and the connection rod of the first embodiment of the invention.
Figure 3B:
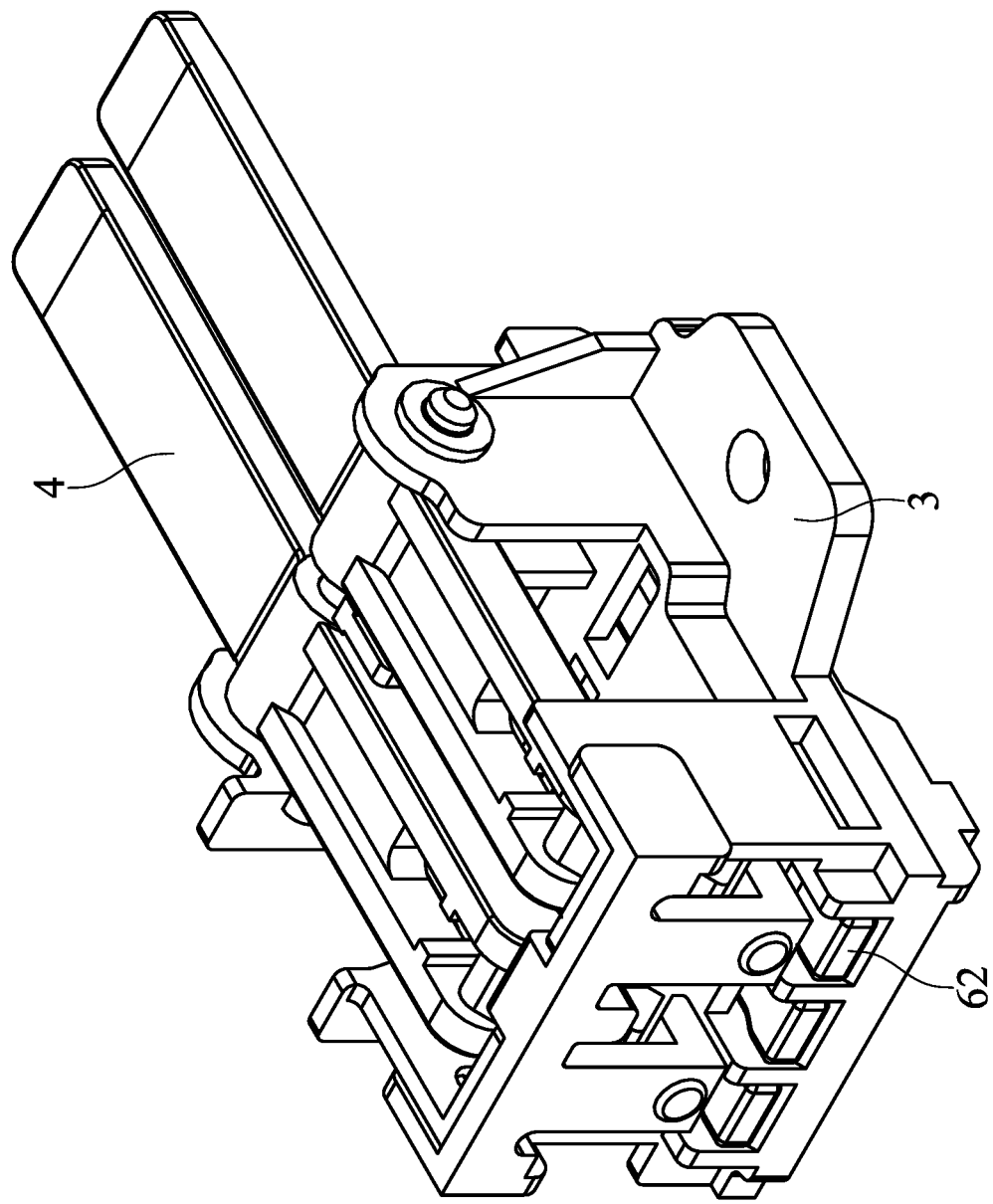

FIGS. 3A and 3B show the details of the mounting base 3 and the connection rod 4 of the first embodiment of the invention. With reference to FIGS. 2A, 2B and 3A, in one embodiment, the mounting base 3 comprises a positioning post 31, and the elastic element 61 is sleeved on the positioning post 31. The positioning post 31 is utilized to position the elastic element 61.

With reference to FIGS. 1, 2A, 2B, 3A and 3B, in one embodiment, the electronic device D1 further comprises a light source 23 and a light guiding element 62. The first wall 11 comprises a light output port 112. The light source 23 is disposed on the circuit board 2. The light guiding element 62 is disposed on the mounting base 3. The light guiding element 62 corresponds to the light source 23 and the light output port 112. Therefore, the light guiding element 62 guides the light provided by the light source 23 to the light output port 112. In one embodiment, the light source 23 is disposed on the edge 22 of the circuit board 2, and the light guiding element 62 is embedded in the mounting base 3.

With reference to FIGS. 2A and 2B, in one embodiment, the electronic device D1 further comprises a connection slot 24. The connection slot 24 is disposed on the circuit board 2. The connection slot 24 is located between the switch element 21 and the edge 22 of the circuit board 2. The connection slot 24 is also located between the second section 44 and the circuit board 2. In one embodiment, the connection slot 24 is for testing. However, the disclosure is not meant to restrict the invention. The connection slot 24 can have other functions, or can be replaced by other elements.

With reference to FIGS. 2A and 2B, in one embodiment, the button unit 5 comprises a button inclined surface 511 and a transmission member 54. The transmission member 54 is connected to the first connection rod end 41. The transmission member 54 comprises a transmission member inclined surface 541. When the button 59 is pushed from the first position (FIG. 2A) to the second position (FIG. 2B), the button inclined surface 511 pushed transmission member inclined surface 541, and the transmission member 54 rotates the connection rod 4 from the first orientation to the second orientation, and the second connection rod end 42 activates the switch element 21.

In the embodiment above, the transmission member 54 can be integrally formed with the first connection rod end 41, or be affixed to the first connection rod end 41. The disclosure is not meant to restrict the invention.

With reference to FIGS. 2A and 2B, in the first embodiment of the invention, the button 59 and the button inclined surface 511 are formed on a free end of a cantilever beam 512 of the button unit 5. The other end of the cantilever beam 512 is connected to an upper portion 513 of the button unit 5. The upper portion 513 of the button unit 5 is affixed to the mounting base 3. The height of the transmission member inclined surface 541 relative to the second wall (bottom plate) 12 is lower than that of the pivot portion 45. In other words, the transmission member inclined surface 541 is closer to the second wall (bottom plate) 12 than the pivot portion 45. However, the disclosure is not meant to restrict the invention. For example, the button 59 and the button inclined surface 511 may slide along a groove of the mounting base 3 to push the transmission member inclined surface 541.

Figure 4:
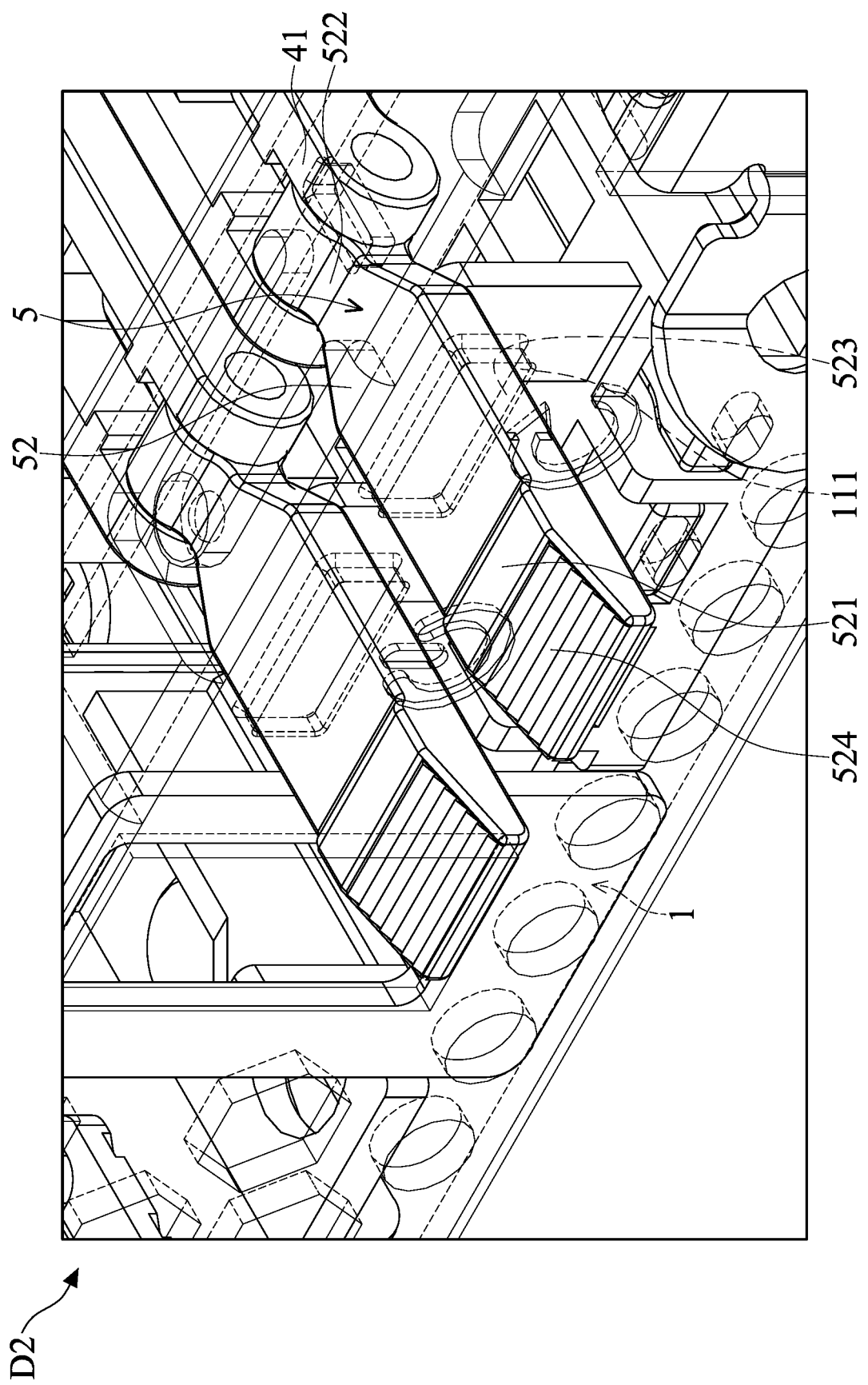
FIG. 4 shows the details of an electronic device of a second embodiment of the invention.
Figure 5A:
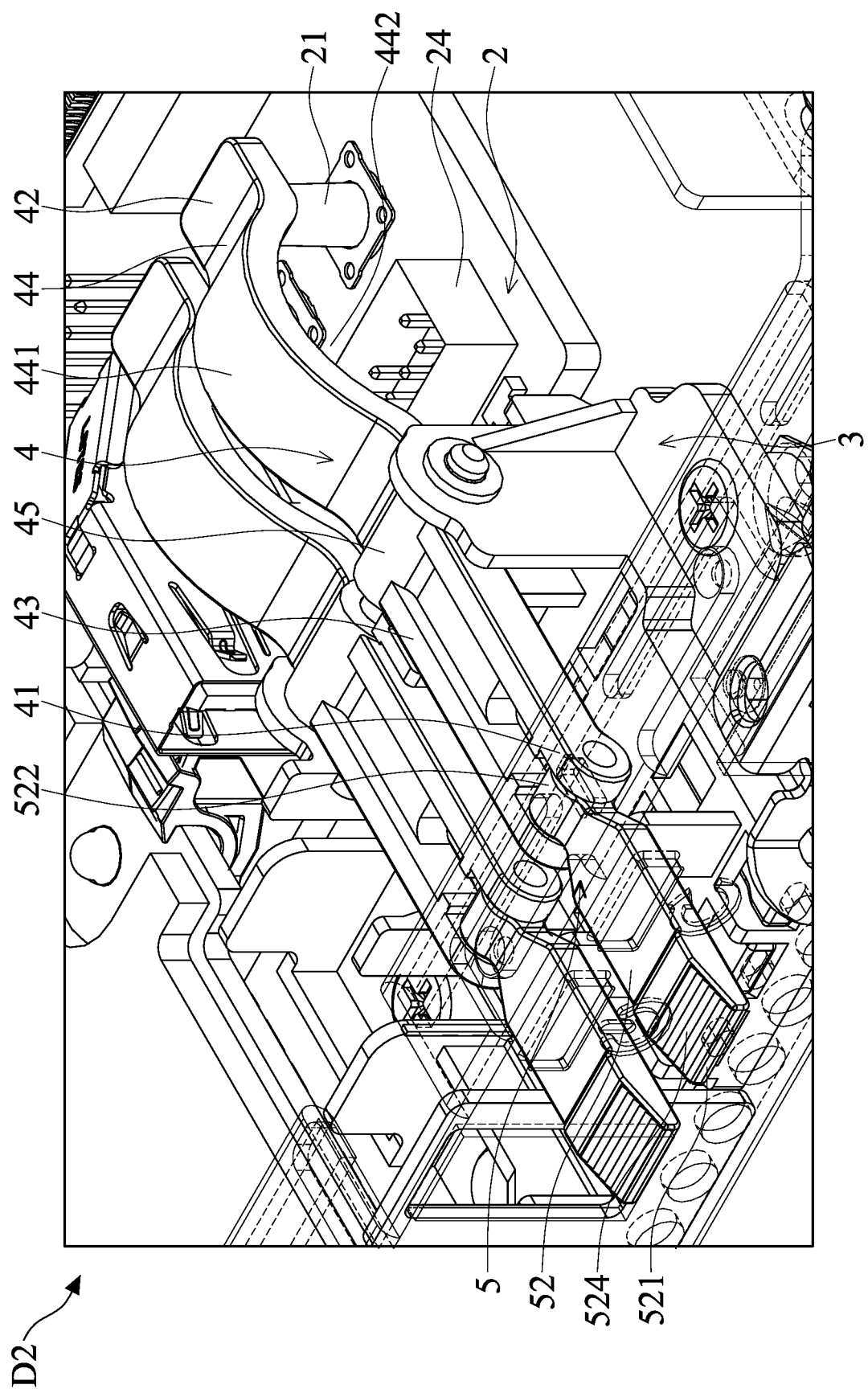
FIG. 5A shows the electronic device of the second embodiment of the invention.
Figure 5B:
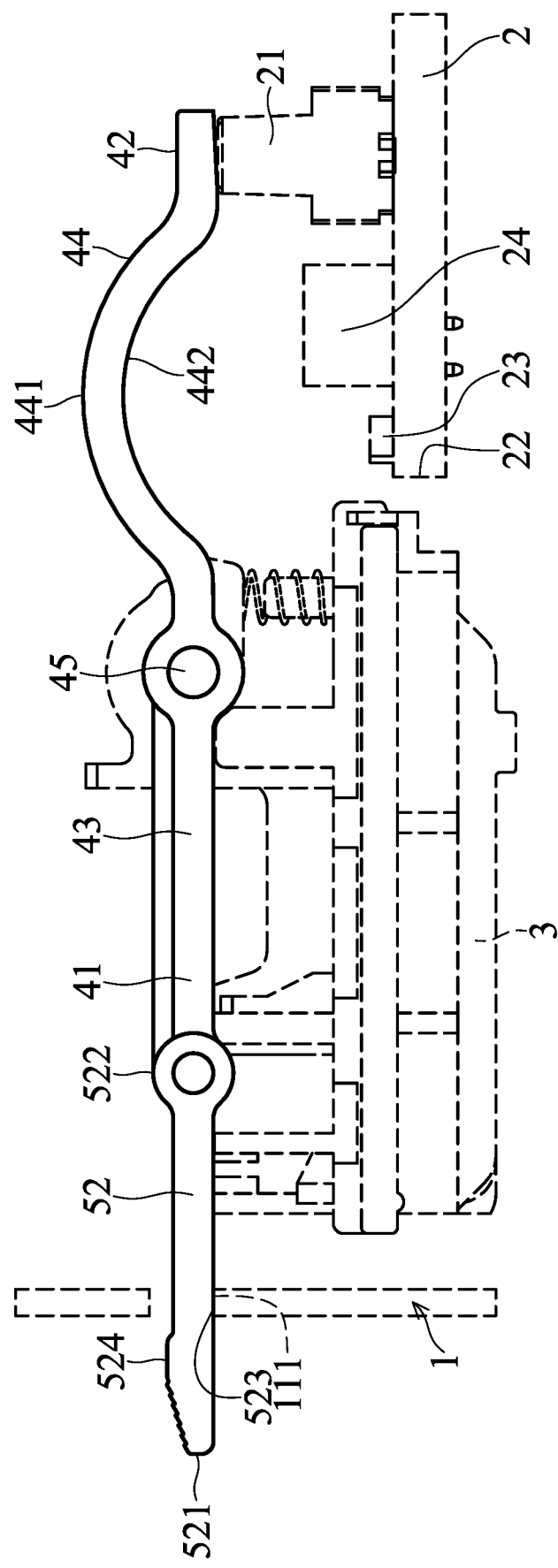
FIG. 5B shows the main structures of the electronic device of the second embodiment of the invention, wherein the connection rod is in the first orientation.
Figure 5C:
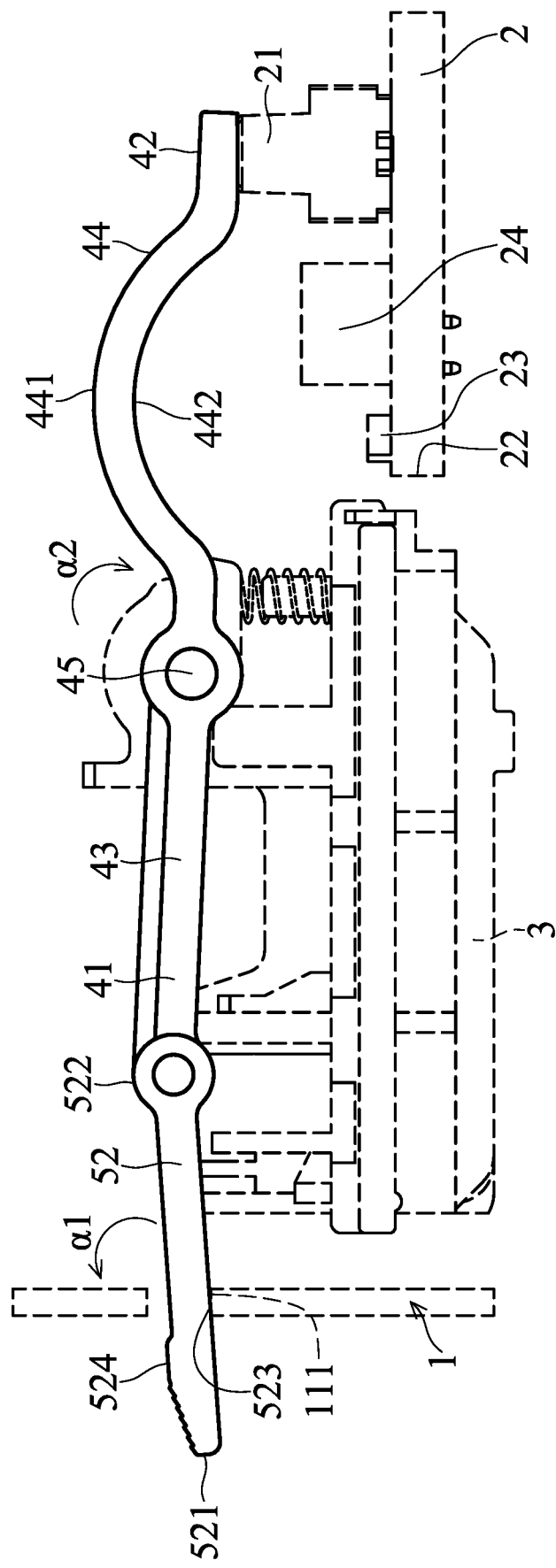
FIG. 5C shows the main structures of the electronic device of the second embodiment of the invention, wherein the connection rod is in the second orientation.

FIG. 4 shows an electronic device D2 of a second embodiment of the invention. In this embodiment, the button unit 5 comprises a button lever 52. The button lever 52 comprises an abutting portion 523, a first lever end 521 and a second lever end 522. The abutting portion 523 is located between the first lever end 521 and the second lever end 522. The button 524 is formed on the first lever end 521. The second lever end 522 pivots on the first connection rod end 41. With reference to FIGS. 5A, 5B and 5C, when the button 524 is pushed from the first position (FIGS. 5A and 5B) to the second position (FIG. 5C), the abutting portion 523 abuts the opening 111, the button lever 52 rotates in a first rotation direction α1 around the abutting portion 523, the second lever end 522 pushes the first connection rod end 41 to rotate the connection rod 4 in a second rotation direction α2 around the pivot portion 45, and the first rotation direction α1 is opposite to the second rotation direction α2. Therefore, the second connection rod end 42 activates the switch element 21.

In this embodiment, the abutting portion 523 is located on the lower surface of the button lever 52. However, the disclosure is not meant to restrict the invention. In another embodiment, the abutting portion 523 can also be located on the upper surface of the button lever 52.

With reference to FIG. 5A, in one embodiment, the second section 44 comprises a curved portion 441, the curved portion 441 forms a recess 442, and the recess 442 faces the connection slot 24. Therefore, the second section 44 is prevented from being interference with the connector or the cable connected to the connection slot 24.

Figure 6:
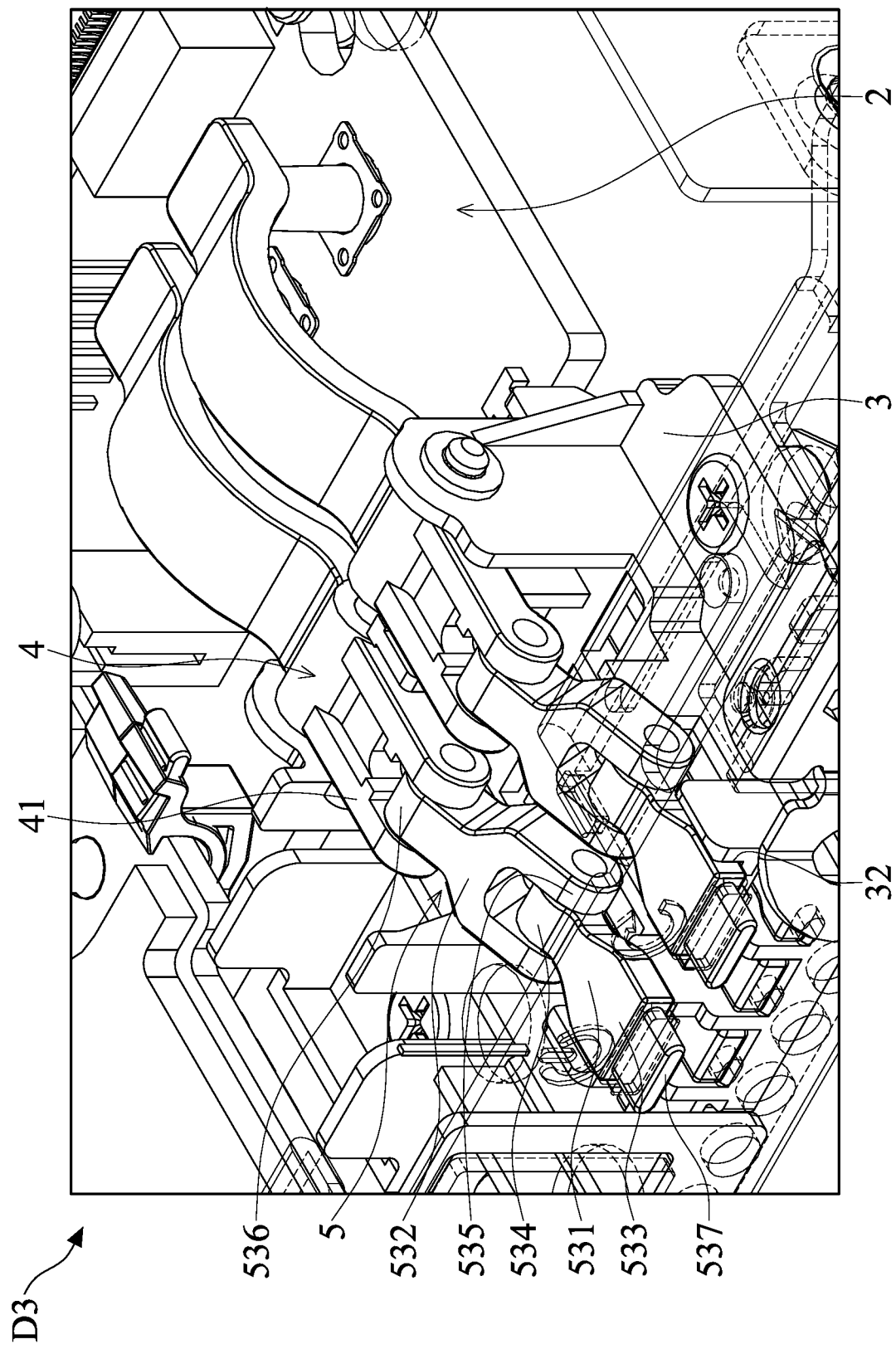
FIG. 6 shows an electronic device of a third embodiment of the invention.
Figure 7A:
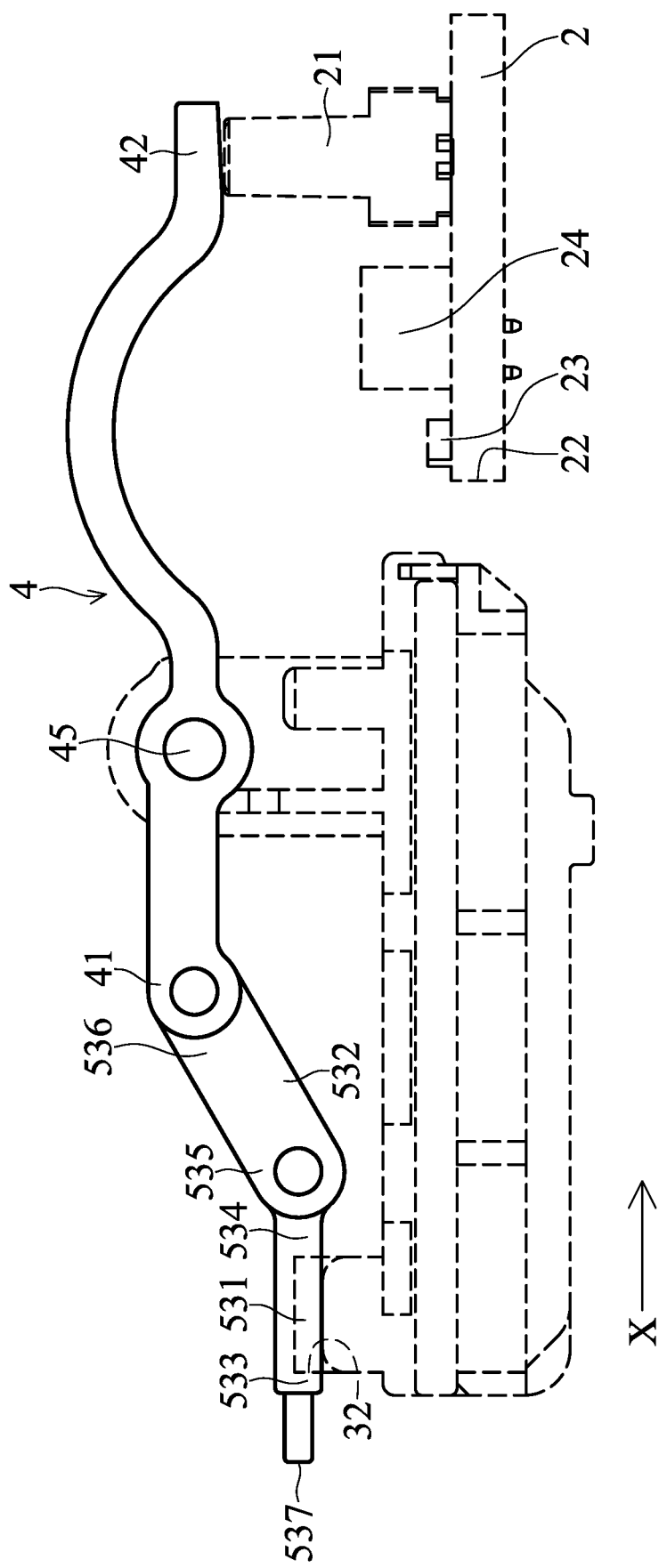
FIG. 7A shows the main structures of the electronic device of the third embodiment of the invention, wherein the connection rod is in the first orientation.
Figure 7B:
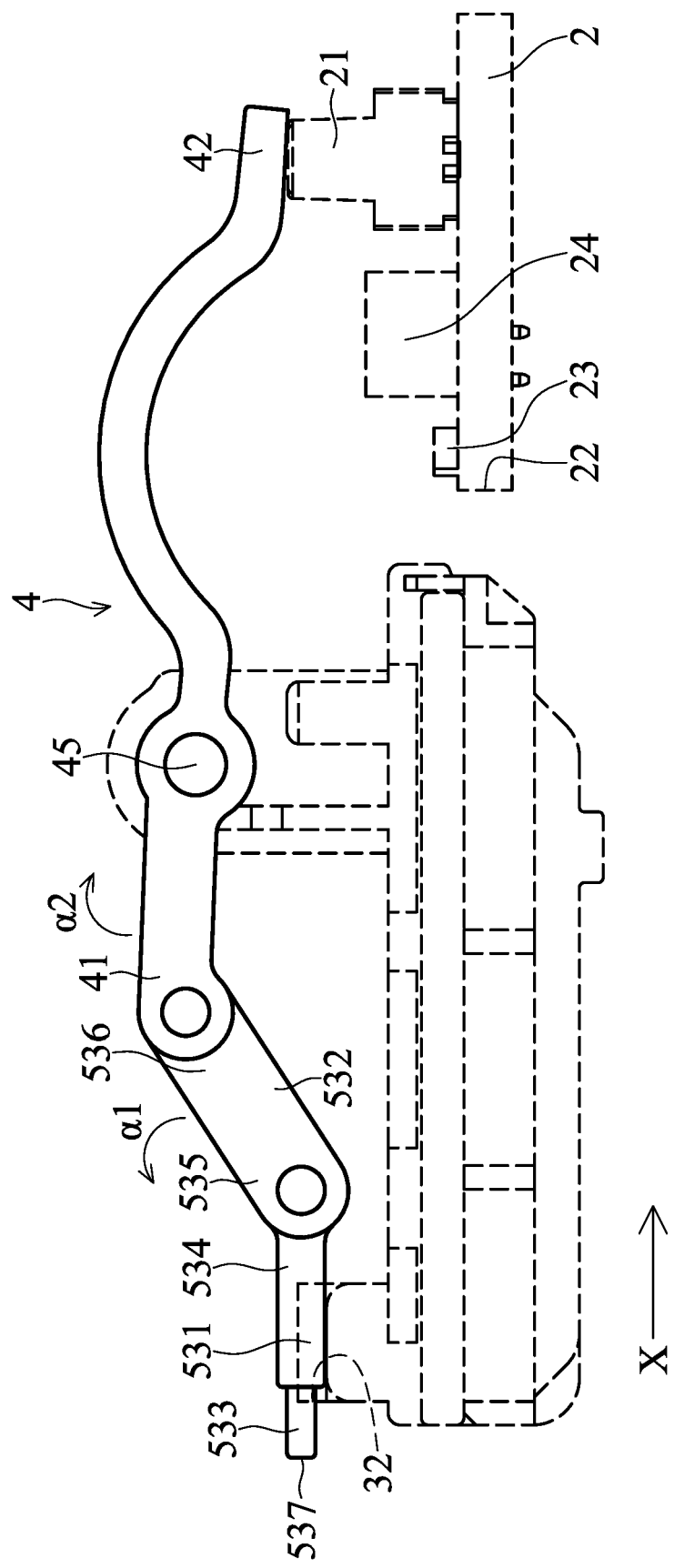
FIG. 7B shows the main structures of the electronic device of the third embodiment of the invention, wherein the connection rod is in the second orientation.

FIG. 6 shows an electronic device D3 of a third embodiment of the invention. With reference to FIG. 6, in this embodiment, the button unit 5 comprises a first rod 531 and a second rod 532. The first rod 531 comprises a first rod end 533 and a second rod end 534. The second rod 532 comprises a third rod end 535 and a fourth rod end 536. The button 537 is formed on the first rod end 533. The second rod end 534 pivots on the third rod end 535. The fourth rod end 536 pivots on the first connection rod end 41. FIGS. 7A and 7B show the movements inside the electronic device D3 of the third embodiment of the invention. With reference to FIGS. 7A and 7B, when the button 537 is pushed from the first position (FIG. 7A) to the second position (FIG. 7B). The first rod 531 pushes the second rod 532 to rotate the second rod 532 in a first rotation direction α1 around the third rod end 535. The fourth rod end 536 pushes the first connection rod end 41 to rotate the connection rod 4 in a second rotation direction α2 around the pivot portion 45. The first rotation direction α1 is opposite to the second rotation direction α2. The second connection rod end 42 therefore activates the switch element 21.

With reference to FIGS. 6, 7A and 7B, in one embodiment, the mounting base 3 comprises a groove 32. The first rod 531 slides in the groove 32. When the button 537 is pushed from the first position to the second position, the first rod 531 is moved in a sliding direction X, and the sliding direction X is parallel to the second wall 12 and perpendicular to the first wall 11. In this embodiment, the distance between the fourth rod end 536 and the second wall 12 is longer than the distance between the third rod end 535 and the second wall 12.

With reference to FIGS. 6, 7A and 7B, in the third embodiment of the invention, the weight of the second rod 532 rotates the connection rod 4 from the second orientation back to the first orientation, and the elastic element in the first and second embodiments can be omitted. However, the disclosure is not meant to restrict the invention. The elastic element can also be utilized in the third embodiment to rotate the connection rod 4 from the second orientation back to the first orientation.

Figure 8:
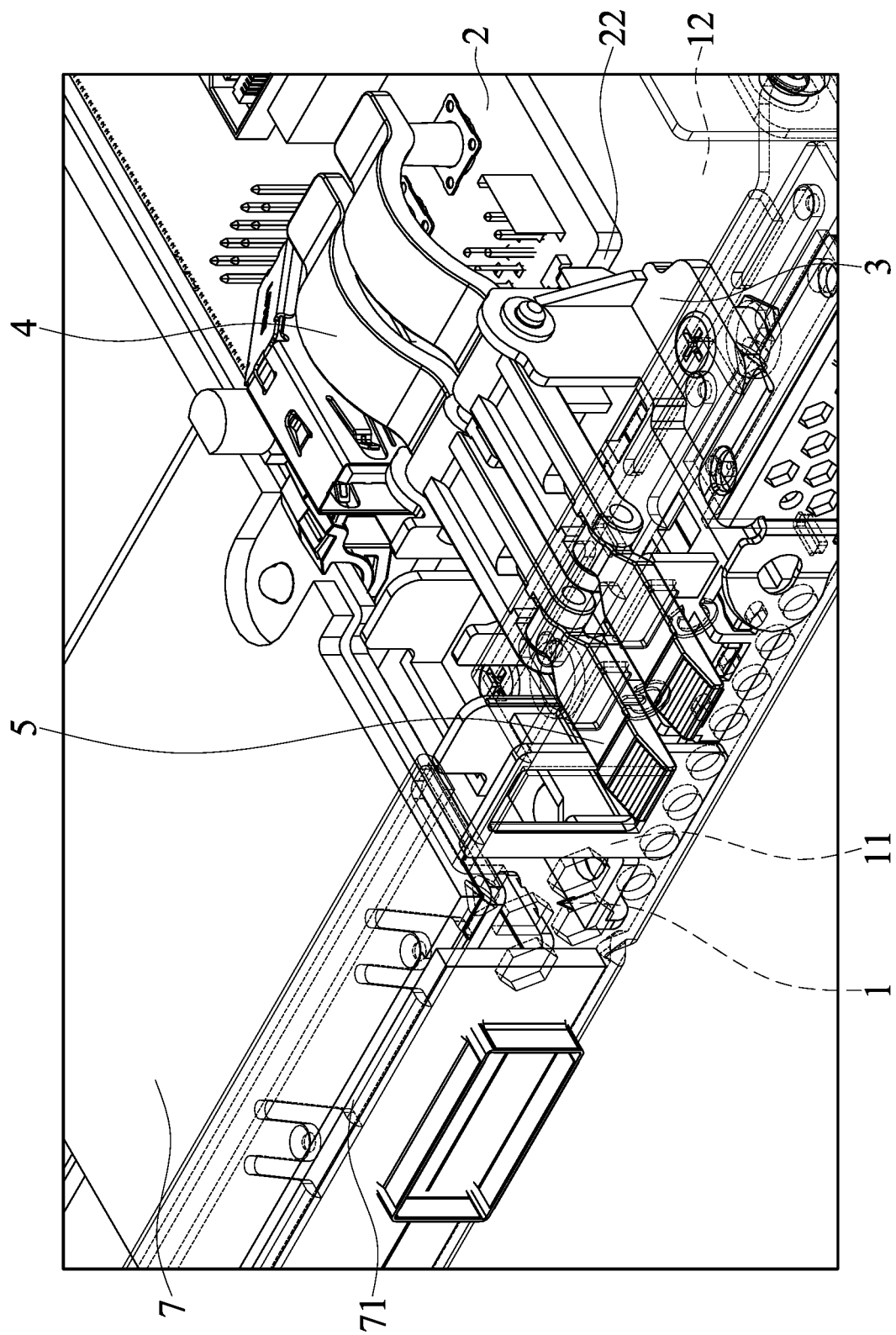
FIG. 8 shows the structure inside the housing of the electronic device of the embodiment of the invention.

With reference to FIG. 8, in one embodiment, the electronic element further comprises an expansion card 7. The expansion card 7 is coupled to the circuit board 2. The expansion card 7 has an expansion card edge 71. The expansion card edge 71 is closer to the first wall 11 than the edge 22 of the circuit board 2. In one embodiment, the expansion card 7 can be the network card or card of other functions. The mounting base 3 is disposed on the second wall 12, and the mounting base 3 is disposed between the edge 22 of the circuit board 2 and the first wall 11. In one embodiment, the mounting base 3 is affixed to the second wall via the bolts.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switch button module, adapted to be disposed in an electronic device, wherein the electronic device comprises a housing, a circuit board and a switch element, the circuit board is disposed in the housing, and the switch element is disposed on the circuit board, comprising:
   a mounting base, affixed to the housing, wherein the mounting base is located between an edge of the circuit board and the housing;
   a connection rod, pivoting on the mounting base, wherein the connection rod comprises a first connection rod end and a second connection rod end, the connection rod rotates between a first orientation and a second orientation, and when the connection rod is in the first orientation, the second connection rod end does not activate the switch element, and when the connection rod is in the second orientation, the second connection rod end activates the switch element; and
   a button unit, connected to the connection rod, wherein the button unit comprises a button, and when the button is pushed from a first position to a second position, the button unit pushes the connection rod from the first orientation to the second orientation,
   wherein the connection rod comprises a first section, a second section, and a pivot portion, wherein the pivot portion is located between the first section and the second section, the first connection rod end is located on the first section, and the second connection rod end is located on the second section,
   wherein the button unit comprises a button lever, the button lever comprises an abutting portion, a first lever end, and a second lever end, the abutting portion is located between the first lever end and the second lever end, the button is formed on the first lever end, the second lever end pivots on the first connection rod end.

2. The switch button module as claimed in claim 1, wherein when the button is pushed from the first position to the second position, the abutting portion abuts the housing, the button lever rotates in a first rotation direction around the abutting portion, the second lever end pushes the first connection rod end to rotate the connection rod in a second rotation direction around the pivot portion, and the first rotation direction is opposite to the second rotation direction.

3. An electronic device, comprising:
   a housing, comprising a first wall and a second wall, wherein the first wall is perpendicular to the second wall, and the first wall comprises an opening;
   a circuit board, disposed in the housing, wherein the circuit board is parallel to the second wall;
   a switch element, disposed on the circuit board, wherein the switch element has an activate direction, and the activate direction is perpendicular to the circuit board;
   a mounting base, affixed to the housing;
   a connection rod, pivoting on the mounting base, wherein the connection rod comprises a first connection rod end and a second connection rod end, the connection rod rotates between a first orientation and a second orientation, and when the connection rod is in the first orientation, the second connection rod end does not activate the switch element, and when the connection rod is in the second orientation, the second connection rod end activates the switch element;
   a button unit, connected to the connection rod, wherein the button unit comprises a button, the button corresponds to the opening, and when the button is pushed from a first position to a second position, the button unit pushes the connection rod from the first orientation to the second orientation, wherein the mounting base is disposed on the second wall, and the mounting base is disposed between an edge of the circuit board and the first wall, wherein the connection rod comprises a first section, a second section and a pivot portion, the pivot portion is located between the first section and a second section, the first connection rod end is located on the first section, and the second connection rod end is located on the second section; and
   an elastic element, wherein the elastic element abuts the mounting base and the second section, and when the connection rod is in the second orientation, the elastic element applies an elastic force upon the second section to rotate the connection rod back to the first orientation.

4. The electronic device as claimed in claim 3, wherein the mounting base comprises a positioning post, and the elastic element is sleeved on the positioning post.

5. The electronic device as claimed in claim 3, wherein the button unit comprises a button inclined surface and a transmission member, the transmission member is connected to the first connection rod end, the transmission member comprises a transmission member inclined surface, and when the button is pushed from the first position to the second position, the button inclined surface pushes the transmission member inclined surface, and the transmission member rotates the connection rod from the first orientation to the second orientation.

6. The electronic device as claimed in claim 3, wherein the button unit comprises a button lever, the button lever comprises an abutting portion, a first lever end and a second lever end, the abutting portion is located between the first lever end and the second lever end, the button is formed on the first lever end, the second lever end pivots on the first connection rod end, and when the button is pushed from the first position to the second position, the abutting portion abuts the opening, the button lever rotates in a first rotation direction around the abutting portion, the second lever end pushes the first connection rod end to rotate the connection rod in a second rotation direction around the pivot portion, and the first rotation direction is opposite to the second rotation direction.

7. The electronic device as claimed in claim 3, wherein the button unit comprises a first rod and a second rod, the first rod comprises a first rod end and a second rod end, the second rod comprises a third rod end and a fourth rod end, the button is formed on the first rod end, the second rod end pivots on the third rod end, the fourth rod end pivots on the first connection rod end, and when the button is pushed from the first position to the second position, the first rod pushes the second rod to rotate the second rod in a first rotation direction around the third rod end, and the fourth rod end pushes the first connection rod end to rotate the connection rod in a second rotation direction around the pivot portion, and the first rotation direction is opposite to the second rotation direction.

8. The electronic device as claimed in claim 7, wherein the mounting base comprises a groove, the first rod slides in the groove, and when the button is pushed from the first position to the second position, the first rod is moved in a sliding direction, and the sliding direction is parallel to the second wall and perpendicular to the first wall.

9. The electronic device as claimed in claim 7, wherein a distance between the fourth rod end and the second wall is longer than a distance between the third rod end and the second wall.

10. The electronic device as claimed in claim 3, further comprising a light source and a light guiding element, the first wall comprises a light output port, the light source is disposed on the circuit board, and the light guiding element is disposed on the mounting base, and the light guiding element corresponds to the light source and the light output port.

11. The electronic device as claimed in claim 10, wherein the light source is disposed on the edge of the circuit board, and the light guiding element is embedded in the mounting base.

12. The electronic device as claimed in claim 3, further comprising a connection slot, the connection slot is disposed on the circuit board, the connection slot is located between the switch element and the edge of the circuit board, and the connection slot is located between the second section and the circuit board.

13. The electronic device as claimed in claim 12, wherein the second section comprises a curved portion, the curved portion forms a recess, and the recess faces the connection slot.

14. The electronic device as claimed in claim 3, wherein the electronic element further comprises an expansion card, the expansion card is coupled to the circuit board, the expansion card has an expansion card edge, and the expansion card edge is closer to the housing than the edge of the circuit board.

* * * * *